UNITED STATES PATENT OFFICE 2,359,332

CARBOXYLIC ACID AMIDE COUPLERS

Ilmari F. Salminen and Arnold Weissberger, Rochester, N. Y., assignors to Eastman Kodak Company, Rochester, N. Y., a corporation of New Jersey No Drawing. Application November 7, 1942, Serial No. 464,892

5 Claims. (Cl. 95—6)

This invention relates to photographic color-forming compounds and particularly to acid amide coupler compounds for color-forming processes of color photography.

The formation of colored photographic images by coupling the development product of aromatic amino developing agents with color-forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols depending upon the composition of the coupler and of the developer.

We have found that certain carboxylic acid amide couplers having in their molecule an active methylene group produce dyes having desirable light absorption and transmission characteristics and possess other valuable properties for purposes of color photography. Our novel couplers have the following general formula:

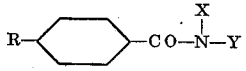

in which R is an alkyl group, X is hydrogen, alkyl, aryl or aralkyl and Y is cyanoacetyl coumarone, acylacetaminophenyl, or cyanoacetylaryl.

Color couplers having a carboxylic acid amide group attached to a phenolic or naphtholic coupling function have been described in British Patent 503,752 and in Salminen, Weissberger and Glass U. S. Patent 2,313,586, granted March 9, 1943, and Salminen, Vittum and Weissberger U. S. application Serial No. 446,777, filed July 12, 1942. Such couplers produce blue-green dyes upon development of an exposed silver halide layer in the presence of an aromatic amino developing agent. The couplers of the present invention produce yellow or magenta dyes depending upon the particular coupling function present in the molecule. The following examples illustrate compounds suitable for use according to our invention:

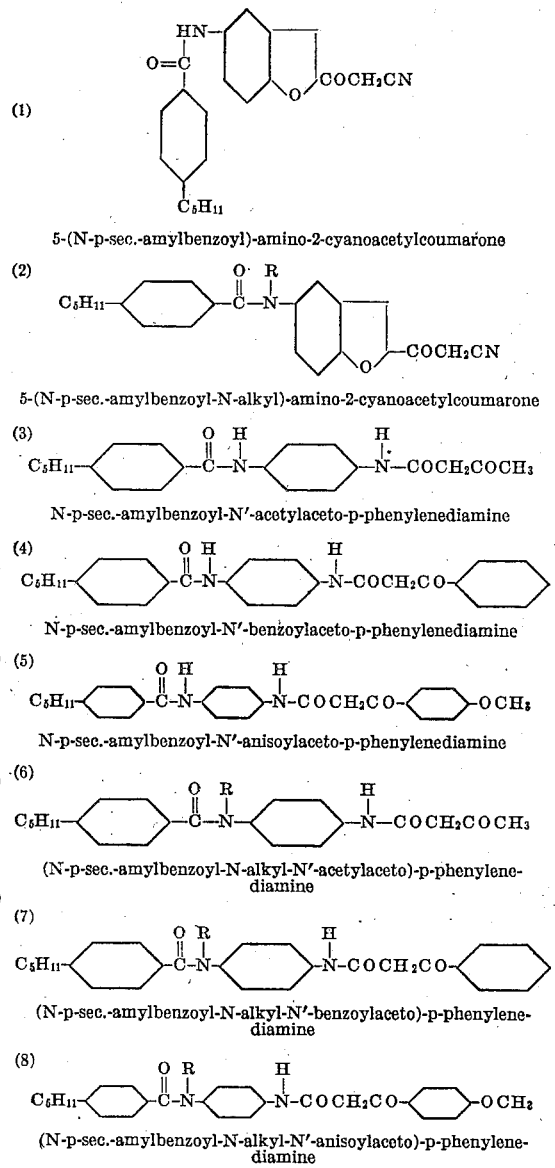

(9)

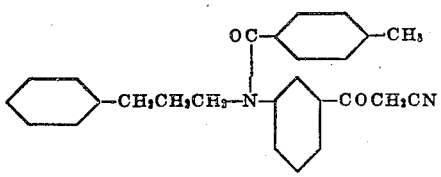

2-cyanoacetyl-N-γ-phenylpropyl-N-p-methylbenzoylaniline

The coupler compounds proposed for use according to our invention may be prepared by condensation of the suitable acyl chloride with the suitable amine alone or in the presence of alkaline agents such as sodium acetate, pyridine, etc. The acyl chloride may be prepared in any suitable manner. For example, p-secondary-amylbenzoyl chloride may be prepared from secondary-amylbenzene and acetic anhydride or acetyl chloride by condensation in a Friedel-Crafts reaction to an acetophenone. The acetophenone is oxidized with sodium hypochlorite to p-secondary amyl benzoic acid and this is converted by means of phosphorus trichloride or thionyl chloride to the acid chloride.

As a specific illustration of this method of preparing our compounds, the coupler N-p-secondary-amylbenzoyl-N'-benzoyl aceto-p-phenylenediamine may be produced as follows:

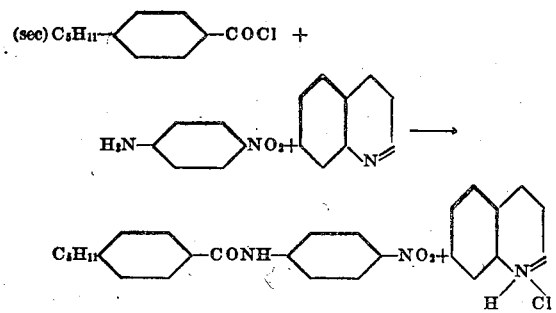

To a stirred solution of 6.9 g. (0.05 mole) of p-nitro-aniline in 30 cc. of dry quinoline was added 10.5 g. of 4'-sec. amylbenzoyl chloride. The temperature of the mixture rose spontaneously to 60°, and the solution was then heated on a steam bath for two hours. After standing overnight at room temperature, the solution was poured into 500 cc. of 5% cold hydrochloric acid. The organic layer was extracted with 100 cc. of ether. The ether layer was washed successively with dilute hydrochloric acid, water, dilute sodium carbonate and with water again. The ether extract was dried, and concentrated to a viscous, yellow oil.

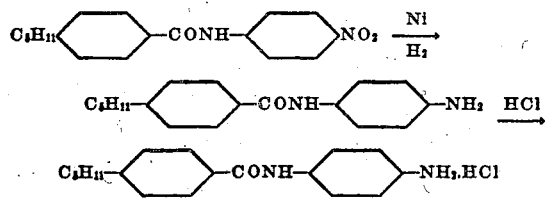

The oil was dissolved in 100 cc. of ethyl alcohol and reduced in the Adam's shaker at an initial pressure of 40 lbs./sq. in and at 90–100°. It required about six hours for the absorption of the correct amount of hydrogen. The catalyst was filtered off, and the hydrochloride was isolated by carefully adding concentrated hydrochloric acid to the cold alcoholic solution. The yield was 8.1 g. (53%). The product did not have a sharp melting point; it slowly decomposed above 200°.

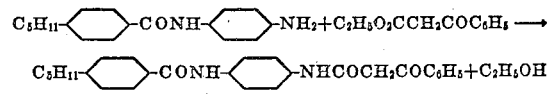

Eight and one-tenth grams (0.03 mole) of 4-(4'-sec. amylbenzamido)aniline hydrochloride was suspended in 200 cc. of 2% alkali and extracted with 100 cc. of benzene. The benzene extract was washed with dilute sodium carbonate, then thoroughly with water and the solution dried with calcium chloride. Then 25 cc. of xylene was added and the benzene was distilled off.

In the meantime 6 cc. of ethyl benzoylacetate in 25 cc. of xylene was heated to 150° in a 50 cc. flask connected through an 8-in. steam-jacketed column to a downward water cooled condenser. The xylene solution of the amine was added to this solution, and the mixture was heated at 150° until no more distillate was obtained. This required about one hour and 3.0 cc. of distillate was collected. Half of the distillate was alcohol which was 85% of theory. The reaction mixture on cooling deposited 5.1 g. of product which melted at 234–235°. It was recrystallized from 125 cc. of glacial acetic acid, obtaining 3.3 g., M. P. 238–239°.

Our coupler compounds may be incorporated in the developing solution or in the emulsion layer depending upon the solubility and diffusion characteristics of the particular coupler. For example, the couplers numbered 1 to 9 are suitable for incorporation in the emulsion layer. When incorporated in the developing solution, our couplers may be used with processes such as those described in Mannes and Godowsky U. S. Patent 2,113,329, granted April 5, 1938, and Mannes, Godowsky and Wilder U. S. Patent 2,252,718, granted August 19, 1941. When used in the sensitive emulsion layer, our couplers may be employed in processes such as those described in Fischer U. S. Patent 1,055,155, granted March 4, 1913, Mannes and Godowsky U. S. Patents 2,304,939 and 2,304,940, granted December 15, 1942, and Jelley and Vittum U. S. Patent 2,322,027, granted June 15, 1943.

The following example illustrates a developing solution containing a coupler employed according to our invention:

*Example 1*

A. 2-amino - 5 - diethylaminotoluene hydrochloride _____ grams__ 2
Sodium sulfide (anhydrous) _____ do____ 2
Sodium carbonate (anhydrous) ___ do____ 20
Potassium bromide_____ do____ 1
Water to_____ liter__ 1

B. N-p-methylbenzoyl-N'-acetylaceto-p-phenylenediamine _____ grams__ 2
Sodium hydroxide (10% solution) ___cc__ 10

B is added to A.

The following example illustrates a developing solution which may be used with our invention when the coupler is incorporated in the emulsion layer:

*Example 2*

Diethyl-p-phenylenediamine sulfate
grams__ 3
Sodium sulfite (anhydrous) _____ do____ 5
Sodium carbonate (anhydrous) _____ do____ 20
Potassium bromide_____ do____ 2
Water to_____ liter__ 1

In the development of exposed photographic silver halide emulsion layers, using the couplers of our invention, any color forming developer containing a primary amino group may be used. These include developers having two primary amino groups as well as those having one of the amino groups substituted or having substituents in the ring such as alkyl phenylenediamines and alkyl toluylene diamines. These compounds are usually used in the salt form such as the hydrochloride or the sulfate which are more stable than the amines themselves. The suitable compounds are diethyl-p-phenylenediamine hydrochloride, monomethyl-p-phenylenediamine hydrochloride, dimethyl-p-phenylenediamine hydrochloride and 2-amino-5-diethylaminotoluene hydrochloride. The p-aminophenols and their substitution products may also be used where the amino group is unsubstituted. All of these developers have an unsubstituted amino group which enables the oxidation products of the developer to couple with the color forming compounds to form a dye image.

Our development process may be employed for the production of colored photographic images in layers of gelatin or other water-permeable colloidal carriers such as collodion, organic esters of cellulose, or synthetic resins. The carrier may be supported by a transparent medium such as glass, a cellulose ester of a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example, in Mannes and Godowsky U. S. Patent No. 2,113,329.

The examples and compounds set forth in the present specification are illustrative only and it is to be understood that our invention is to be taken as limited only by the scope of the appended claims.

We claim:

1. The method of producing a colored photographic image in a gelatino-silver halide emulsion layer which comprises exposing the layer and developing it with a primary aromatic amino developing agent in the presence of a coupler compound having the formula:

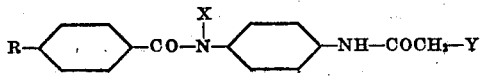

in which R is an alkyl group, X is selected from the class consisting of hydrogen, alkyl, aryl and aralkyl groups and Y is an acyl group.

2. The method of producing a colored photographic image in a gelatino-silver halide emulsion layer which comprises exposing the layer and developing it with a primary aromatic amino developing agent in the presence of a coupler compound having the formula:

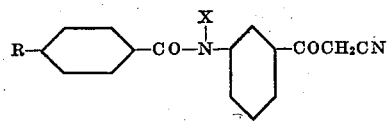

in which R is an alkyl group, and X is selected from the class consisting of hydrogen, alkyl, aryl and aralkyl groups.

3. A color-forming photographic developer comprising a primary aromatic amino developing agent and a coupler compound having the formula:

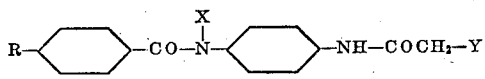

in which R is an alkyl group, X is selected from the class consisting of hydrogen, alkyl, aryl, and aralkyl groups and Y is an acyl group.

4. A color-forming photographic developer comprising a primary aromatic amino developing agent and a coupler compound having the formula:

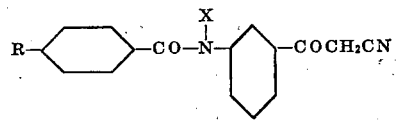

in which R is an alkyl group, and X is selected from the class consisting of hydrogen, alkyl, aryl and aralkyl groups.

5. A photographic emulsion for forming colored images comprising a water-permeable colloidal carrier containing a sensitive silver-halide and a coupler compound having the formula:

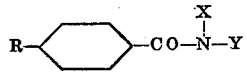

in which R is an alkyl group of at least five carbon atoms, X is selected from the class consisting of alkyl, aryl and aralkyl groups and Y is selected from the class consisting of cyanoacetyl coumarone, acyl acetaminophenyl and cyanoacetylaryl groups.

ILMARI F. SALMINEN.
ARNOLD WEISSBERGER.